(12) United States Patent
Matsumura et al.

(10) Patent No.: US 12,081,300 B2
(45) Date of Patent: Sep. 3, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 344 days.

(21) Appl. No.: 17/608,108

(22) PCT Filed: May 2, 2019

(86) PCT No.: PCT/JP2019/018190
§ 371 (c)(1),
(2) Date: Nov. 1, 2021

(87) PCT Pub. No.: WO2020/222279
PCT Pub. Date: Nov. 5, 2020

(65) Prior Publication Data
US 2022/0286175 A1 Sep. 8, 2022

(51) Int. Cl.
*H04W 36/00* (2009.01)
*H04B 7/06* (2006.01)
*H04B 7/08* (2006.01)
*H04B 17/336* (2015.01)
*H04W 56/00* (2009.01)
*H04W 72/00* (2023.01)

(52) U.S. Cl.
CPC ......... *H04B 7/0626* (2013.01); *H04B 7/0617* (2013.01); *H04B 7/0695* (2013.01); *H04B 7/0888* (2013.01); *H04B 17/336* (2015.01); *H04W 56/001* (2013.01)

(58) Field of Classification Search
None
See application file for complete search history.

(56) References Cited

U.S. PATENT DOCUMENTS

| | | | |
|---|---|---|---|
| 10,485,000 B2 * | 11/2019 | Shaheen | H04W 36/0094 |
| 11,096,186 B2 * | 8/2021 | Wang | H04L 1/0003 |
| 11,777,576 B2 * | 10/2023 | Gao | H04B 17/345 |
| | | | 370/329 |

(Continued)

FOREIGN PATENT DOCUMENTS

JP 2018-512027 A 4/2018

OTHER PUBLICATIONS

Office Action in the counterpart Chinese Application No. 201980098087.1, mailed Apr. 25, 2023 (11 pages).

(Continued)

*Primary Examiner* — Sithu Ko
(74) *Attorney, Agent, or Firm* — Osha Bergman Watanabe & Burton LLP

(57) ABSTRACT

A user terminal includes a control section that measures a Signal to Interference plus Noise Ratio (SINR), based on a channel measurement resource at a given order in a channel measurement resource set and an interference measurement resource at the given order in an interference measurement resource set, and a transmitting section that reports the SINR and an indicator related to the given order. According to an aspect of the present disclosure, it is possible to perform appropriate beam reporting.

5 Claims, 15 Drawing Sheets

(56) References Cited

U.S. PATENT DOCUMENTS

| | | | |
|---|---|---|---|
| 2018/0091273 A1 | 3/2018 | Choi et al. | |
| 2019/0306924 A1* | 10/2019 | Zhang | H04B 7/063 |
| 2020/0099432 A1* | 3/2020 | Määttanen | H04B 7/0617 |
| 2020/0145866 A1* | 5/2020 | Onggosanusi | H04B 7/0617 |
| 2020/0220631 A1* | 7/2020 | Onggosanusi | H04B 17/327 |
| 2021/0400677 A1* | 12/2021 | Lee | H04L 5/005 |

OTHER PUBLICATIONS

Huawei, HiSilicon: "Beam measurement and reporting using L1-SINR"; 3GPP TSG RAN WG1 Meeting #96bis, R1-1903976, Xi'an, China, Apr. 8-12, 2019 (7 pages).

International Search Report issued in PCT/JP2019/018190 on Dec. 24, 2019 (1 page).

Written Opinion of the International Searching Authority issued in PCT/JP2019/018190 on Dec. 24, 2019 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

```
CSI-ReportConfig ::=                    SEQUENCE {
    reportConfigId                          CSI-ReportConfigId,
    carrier                                 ServCellIndex                           OPTIONAL, -- Need S
    resourcesForChannelMeasurement          CSI-ResourceConfigId,
    csi-IM-ResourcesForInterference         CSI-ResourceConfigId                    OPTIONAL, -- Need R
    nzp-CSI-RS-ResourcesForInterference     CSI-ResourceConfigId                    OPTIONAL, -- Need R
    ...
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}             OPTIONAL
        },
        cri-RI-CQI                              NULL,
        cri-RSRP                                NULL,
        ssb-Index-RSRP                          NULL,
        cri-RI-LI-PMI-CQI                       NULL
    }, ...
    }, ...
    groupBasedBeamReporting                 CHOICE {
        enabled                                 NULL,
        disabled                                SEQUENCE {
            nrofReportedRS                          ENUMERATED {n1, n2, n3, n4}     OPTIONAL -- Need S
        }, ...
    }
}
```

FIG. 1

```
reportQuantity            CHOICE {
    none                      NULL,
    cri-RI-PMI-CQI            NULL,
    ...
    cri-RI-CQI                NULL,
    cri-RSRP                  NULL,
    ssb-Index-RSRP            NULL,
    cri-RI-LI-PMI-CQI         NULL,
    cri-SINR                  NULL,
    ssb-Index-SINR            NULL,
    cri-RSRP-SINR             NULL,
    ssb-Index-RSRP-SINR       NULL,
    cri-imr-Index-SINR        NULL,
    ssb-Index-imr-Index-SINR  NULL,
    cri-imr-Index-RSRP-SINR   NULL,
    ssb-Index-imr-Index-RSRP-SINR NULL,
    imr-Index                 NULL
},
```

FIG. 5

```
reportQuantity              CHOICE {
    none                        NULL,
    cri-RI-PMI-CQI              NULL,
    ...
    cri-RSRP                    NULL,
    ssb-Index-RSRP              NULL,
    cri-RI-LI-PMI-CQI           NULL
},
reportQuantity-r16          CHOICE {
    none                        NULL,
    cri-RI-PMI-CQI              NULL,
    cri-RI-i1                   NULL,
    ...
    cri-RI-CQI                  NULL,
    cri-RSRP                    NULL,
    ssb-Index-RSRP              NULL,
    cri-RI-LI-PMI-CQI           NULL,
    cri-SINR                    NULL,
    ssb-Index-SINR              NULL,
    cri-RSRP-SINR               NULL,
    ssb-Index-RSRP-SINR         NULL,
    cri-imr-Index-SINR          NULL,
    ssb-Index-imr-Index-SINR    NULL,
    cri-imr-Index-RSRP-SINR     NULL,
    ssb-Index-imr-Index-RSRP-SINR NULL,
    imr-Index                   NULL
},
```

FIG. 6

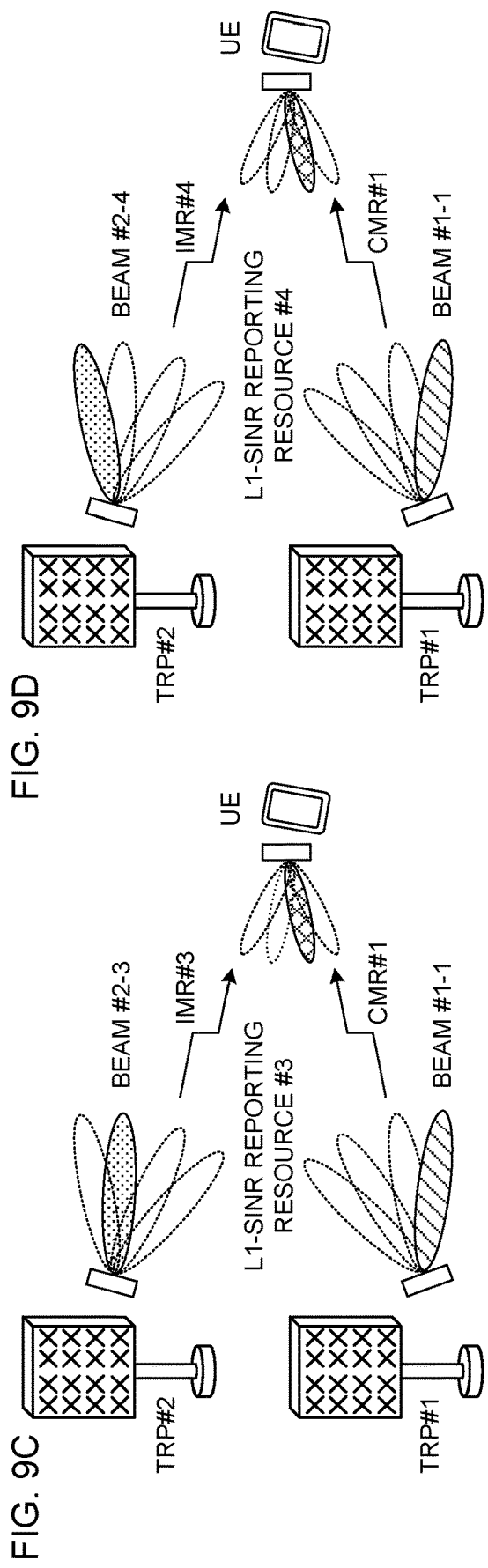
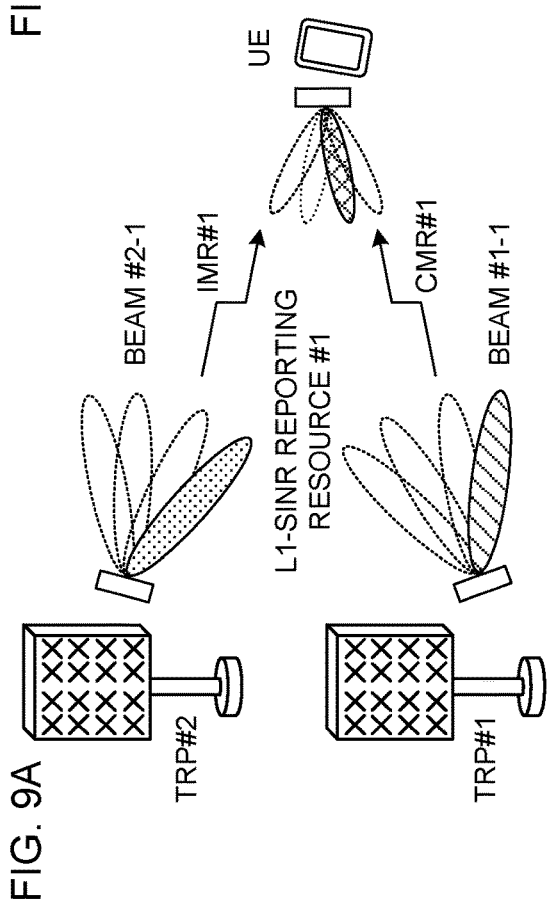

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In an existing LTE system (for example, LTE Rel. 8 to Rel. 13), a user terminal (User Equipment (UE)) periodically and/or aperiodically transmits channel state information (CSI) to a base station. The UE transmits the CSI by using at least one of an uplink control channel (Physical Uplink Control Channel (PUCCH)) and an uplink shared channel (Physical Uplink Shared Channel (PUSCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Discussions have been made on a method of beam management (BM) for a future radio communication system (for example, NR). It has been discussed that, in the beam management, beam selection is performed based on an L1-RSRP (reference signal received power (RSRP) in a physical layer (layer 1)) reported by a UE.

Discussions have been also made on use of a result of beam measurement (such as interference measurement) other than the L1-RSRP. However, discussions on a specific method of notification to a UE for such new beam selection/reporting have not significantly proceeded. When such selection/reporting cannot be performed, beam selection cannot be appropriately performed, which potentially causes a problem such as communication throughput decrease.

Thus, an object of the present disclosure is to provide a user terminal and a radio communication method that are capable of performing appropriate beam reporting.

Solution to Problem

A user terminal according to an aspect of the present disclosure includes a control section that measures a Signal to Interference plus Noise Ratio (SINR), based on a channel measurement resource at a given order in a channel measurement resource set and an interference measurement resource at the given order in an interference measurement resource set, and a transmitting section that reports the SINR and an indicator related to the given order.

Advantageous Effects of Invention

According to an aspect of the present disclosure, it is possible to perform appropriate beam reporting.

BRIEF DESCRIPTION OF DRAWINGS

FIG. 1 is an extract from an RRC information element "CSI-ReportConfig";

FIG. 5 is a diagram to show an example of report quantity information for reporting at least one of an L1-SINR and an IMR index;

FIG. 6 is a diagram to show another example of the report quantity information for reporting at least one of the L1-SINR and the IMR index;

FIGS. 9A to 9D are diagrams to show an example of L1-SINR reporting according to Fourth Embodiment;

DESCRIPTION OF EMBODIMENTS (CSI Reporting)

Figure 2:
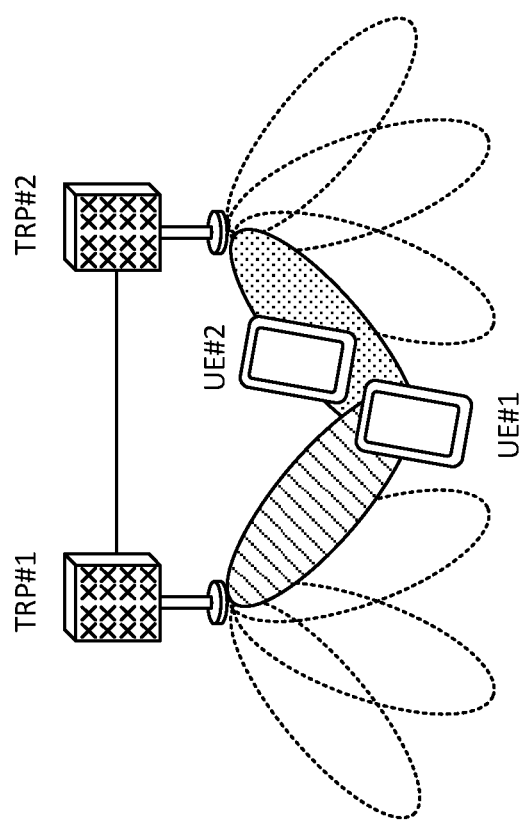
FIG. 2 is a diagram to show an example of beam selection based on an RSRP.

In NR, a UE measures a channel state by using a certain reference signal (or a resource for the reference signal) and feeds back (reports) channel state information (CSI) to a base station.

The UE may measure the channel state by using a channel state information-reference signal (CSI-RS), a synchronization signal/broadcast channel (Synchronization Signal/Physical Broadcast Channel (SS/PBCH)) block, a synchronization signal (SS), a demodulation reference signal (DMRS), or the like.

A CSI-RS resource may include at least one of a non zero power (NZP) CSI-RS and CSI-Interference Management (IM). An SS/PBCH block includes synchronization signals (for example, a primary synchronization signal (PSS) and a secondary synchronization signal (SSS)) and a PBCH (and a corresponding DMRS) and may be referred to as, for example, an SS block (SSB). An SSB index may be provided to a time position of the SSB in a half frame.

Note that CSI may include at least one of a channel quality indicator (CQI), a precoding matrix indicator (PMI), a CSI-RS resource indicator (CRI), an SS/PBCH block resource indicator (SS/PBCH block Resource indicator (SSBRI)), a layer indicator (LI), a rank indicator (RI), a Layer 1 (L1)-Reference Signal Received Power (RSRP) (reference signal received power in the layer 1), an L1-Reference Signal Received Quality (RSRQ), an L1-Signal to Interference plus Noise Ratio (SINR), an L1-Signal to Noise Ratio (SNR), and the like.

CSI may include a plurality of parts. A first part (CSI part 1) of the CSI may include information (for example, RI) of a relatively small number of bits. A second part (CSI part 2) of the CSI may include information (for example, CQI) of a relatively large number of bits, such as information determined based on CSI part 1.

For example, (1) periodic CSI (P-CSI) reporting, (2) aperiodic CSI (A(AP)-CSI) reporting, and (3) semi-persistent CSI (Semi-Persistent CSI (SP-CSI)) reporting have been discussed as a CSI feedback method.

The UE may be notified of information related to CSI reporting (may be referred to as CSI reporting configuration information) by using higher layer signaling, physical layer signaling (for example, downlink control information (DCI)), or a combination thereof. The CSI reporting configuration information may be configured by using, for example, an RRC information element "CSI-ReportConfig."

The higher layer signaling may be, for example, any of Radio Resource Control (RRC) signaling, Medium Access Control (MAC) signaling, and broadcast information, or a combination thereof.

The MAC signaling may use a MAC control element (MAC CE), a MAC Protocol Data Unit (MAC PDU), or the like, for example. The broadcast information may be, for example, a master information block (MIB), a system information block (SIB), remaining minimum system information (RMSI), or other system information (OSI).

The CSI reporting configuration information may include information related to a reporting period, an offset, or the like, and the information may be expressed in a certain time unit (slot unit, subframe unit, symbol unit, or the like), for example. The CSI reporting configuration information may include a configuration ID (CSI-ReportConfigId). The configuration ID may specify the kind of a CSI reporting method (such as whether the method is SP-CSI reporting) and a parameter such as the reporting period. The CSI reporting configuration information may include information (CSI-ResourceConfigId) indicating which signal (or which signal resource) is used to measure CSI to be reported.

(Beam Management)

In Rel-15 NR, a beam management (BM) method has been discussed. It has been discussed that, in beam management, beam selection is performed based on an L1-RSRP reported by the UE. Changing (switching) of a beam of a signal/channel may correspond to changing of (Transmission Configuration Indication state) of the signal/channel.

Note that a beam selected through beam selection may be a transmission beam (Tx beam) or a reception beam (Rx beam). The beam selected through beam selection may be a beam for the UE or a beam for the base station.

The UE may report (transmit) a measurement result for beam management by using a PUCCH or a PUSCH. The measurement result may be, for example, CSI including at least one of an L1-RSRP, an L1-RSRQ, an L1-SINR, an L1-SNR, and the like. The measurement result may be referred to as, for example, a beam measurement, a beam measurement result, a beam report, or a beam measurement report.

CSI measurement for a beam report may include interference measurement. The UE may measure channel quality, interference, or the like by using a CSI measurement resource and derive a beam report. The CSI measurement resource may be at least one of an SS/PBCH block resource, a CSI-RS resource, any other reference signal resource, and the like, for example. Configuration information of CSI measurement reporting may be configured for the UE by using the higher layer signaling.

The beam report may include at least one of a channel quality measurement result and an interference measurement result. The channel quality measurement result may include, for example, an L1-RSRP. The interference measurement result may include an L1-SINR, an L1-SNR, an L1-RSRQ, any other indicator related to interference (for example, an optional indicator that is not an L1-RSRP), or the like.

Note that a resource of CSI measurement for beam management may be referred to as a beam measurement resource. A signal/channel as the target of CSI measurement may be referred to as a beam measurement signal. CSI measurement/reporting may be interpreted as at least one of measurement/reporting for beam management, beam measurement/reporting, radio link quality measurement/reporting, and the like.

The CSI reporting configuration information based on consideration of beam management of the current NR will be described below with reference to FIG. 1. FIG. 1 is an extract of the RRC information element "CSI-ReportConfig." FIG. 1 is written by using the ASN.1 (Abstract Syntax Notation One) notation (same for FIGS. 5 and 6 to be described later).

The CSI reporting configuration information (CSI-ReportConfig) may include report quantity information (may be referred to as a "report quantity" or an RRC parameter "reportQuantity") that is information of a parameter to be reported. The report quantity information is defined by an ASN.1 object type "choice." Accordingly, one of parameters (such as a cri-RSRP and an ssb-Index-RSRP) defined as the report quantity information is configured.

The UE for which a higher layer parameter (for example, an RRC parameter "groupBasedBeamReporting") included in the CSI reporting configuration information is configured to be enabled may include, for each report configuration, a plurality of beam measurement resource IDs (for example, SSBRIs and CRIs) and a plurality of corresponding measurement results (for example, L1-RSRPs) in a beam report.

The UE configured with a reporting target RS resource number equal to one or larger by a higher layer parameter (for example, an RRC parameter "nrofReportedRS") included in the CSI reporting configuration information may include, for each report configuration, one or more beam measurement resource IDs and one or more corresponding measurement results (for example, L1-RSRPs) in a beam report.

In Rel-15 NR, a cri-RSRP and an ssb-Index-RSRP in the report quantity information are related to beam management. The UE configured with a cri-RSRP reports a CRI and an L1-RSRP corresponding to the CRI. The UE configured with the ssb-Index-RSRP reports an SSBRI and an L1-RSRP corresponding to the SSBRI.

However, with NR that has been discussed, beam selection can be performed based on only an L1-RSRP. It is not allowed to perform configuration to include interference reporting in a beam report.

In an example of FIG. 2, UE #1 is connected to transmission/reception point (TRP) #1, and UE #2 is connected to TRP #2. TRP #1 uses beam #1-4 based on an RSRP measured by UE #1. TRP #2 uses beam #2-1 based on an RSRP measured by UE #2. Beam #2-1 is the most preferable for UE #2 but provides the highest interference to UE #1.

When beam selection and reporting are related to only L1-RSRP in this manner, beam selection by using only RSRP potentially leads to interference and causes a problem such as communication throughput decrease.

Thus, the inventors of the present invention came up with the idea of CSI reporting configuration for appropriate beam selection and beam reporting.

Embodiments according to the present invention will be described in detail with reference to the drawings as follows. The radio communication methods according to respective embodiments may each be employed individually, or may be employed in combination.

In the present disclosure, a TRP, a panel, a base station, a cell, a component carrier (CC), a cell group, a network (NW), and a gNB may be interchangeably interpreted.

In the present disclosure, "interference", an SINR, an SNR, an RSRQ, any other indicator related to interference (for example, an optional indicator that is not L1-RSRP), and interference electric power may be interchangeably interpreted.

In the present disclosure, an L1-SINR, an L3-SINR, and an SINR may be interchangeably interpreted.

In the present disclosure, a channel, a signal, and a channel/signal may be interchangeably interpreted.

In the present disclosure, a CMR index, a CMR indicator, an SSBRI, and a CRI may be interchangeably interpreted.

In the present disclosure, an IMR index, an IMR indicator, an SSBRI, and a CRI may be interchangeably interpreted.

(Radio Communication Method)

A UE may be configured with a plurality of interference measurement resources (IMRs) to obtain interference levels on different hypotheses (cases or situations).

The UE may report some pieces of additional information together with an L1-SINR to notify an NW of which interference hypothesis is assumed for the reported L1-SINR. The NW can perform scheduling by using such a report, thereby reducing interference.

The UE may be configured with, by one TRP, a plurality of IMRs corresponding to a plurality of beams from another TRP.

Figure 3:
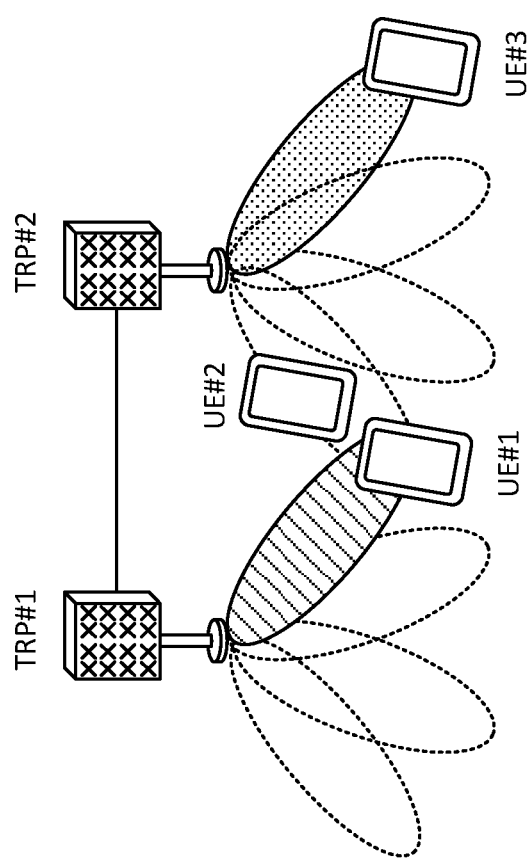
FIG. 3 is a diagram to show an example of beam selection based on an SINR.

In an example of FIG. 3, TRPs #1 and #2 may use the same cell or different cells. TRPs #1 and #2 may be connected to each other through backhaul and cooperatively perform scheduling.

UE #1 reports a most preferable (for example, highest L1-RSRP) beam and reports beam #2-4 that provides minimum interference (for example, highest L1-SINR). TRP #1 may schedule use of beam #1-1 for UE #1 based on the report. TRP #2 may schedule, for UE #3 for which beam #2-4 is the most preferable, use of beam #2-4 in a duration in which UE #1 is scheduled. TRP #2 may schedule, for UE #2 for which beam #2-1 is the most preferable, use of beam #2-1 in a duration other than the duration in which UE #1 is scheduled.

Each UE may report higher N measured L1-SINRs and indexes of the corresponding resources, may measure L1-RSRPs (or signal electric power values) and L1-SINRs by using the same channel measurement resource (CMR) and report L1-SINRs corresponding to higher N measured L1-RSRPs, and indexes of the corresponding resources, or may measure L1-RSRPs (or signal electric power values) and L1-SINRs by using the same SMR and report L1-SINRs corresponding to higher N values based on the L1-SINRs and the L1-RSRPs (for example, values obtained from a calculation formula using the L1-SINRs and the L1-RSRPs, or at least one of a weighted sum of the L1-SINRs and a weighted sum of the L1-RSRPs), and indexes of the corresponding resources.

A CMR may be interpreted as a signal measurement resource (SMR), a signal power measurement resource, or a signal strength measurement resource, or the like.

The UE may be configured with a channel measurement RS as a CMR. The channel measurement RS may be an SSB or a CSI-RS. A CMR index (CMR indicator, RS index, or ID) for identifying the CMR may indicate an index (entry number) in a CMR set, indicate an SSB index, or indicate a CSI-RS index.

The UE may be configured with at least one of an IMR for measurement of Inter-TRP interference and an IMR for measurement of inter-cell interference.

An IMR may be a zero power (ZP) CSI-RS resource, a non zero power (NZP) CSI-RS resource, or an SSB resource. An IMR index (IMR indicator or ID) for identifying the IMR may be an index (entry number) in an IMR set, indicate a CSI-RS index (CRI), indicate a ZP CSI-RS index, indicate an NZP CSI-RS index, or indicate an SSB index.

First Embodiment

When configured with L1-SINR measurement based on a channel measurement RS, a UE may be configured with a channel measurement RS associated with one or more interference measurement resources (IMRs) of interference measurement.

Whether the UE reports only an L1-RSRP, only an L1-SINR, or both of the L1-RSRP and the L1-SINR may be configured by the higher layer (for example, RRC) signaling or may be defined in specifications.

The UE may report a CMR index (for example, SSBRI or CRI) and at least one of an L1-RSRP and an L1-SINR.

Whether the UE needs to report an IMR index in beam reporting based on an L1-SINR may be configured by the higher layer signaling or may be defined in specifications. The UE may report the IMR index together with the L1-SINR. The UE may always report the IMR index when configured with a plurality of IMRs and reporting the L1-SINR. The UE may always report the IMR index when configured with a plurality of IMRs, configured with reporting of the IMR index, and reporting the L1-SINR. The UE does not necessarily need to always report the IMR index when configured with a plurality of IMRs, not configured with reporting of the IMR index, and reporting the L1-SINR. The UE does not necessarily need to report the IMR index when configured with one IMR and reporting the L1-SINR. The UE may always report the IMR index when reporting the L1-SINR. In this case, a payload of UCI measurement reporting can be kept constant, which leads to reduction of a processing load.

The UE may measure a plurality of L1-RSRPs based on one or more CMRs, select one or more L1-RSRPs from among the plurality of L1-RSRPs, and report the selected L1-RSRPs and CMR indexes used in the measurement of the selected L1-RSRPs.

The UE may measure a plurality of L1-SINRs based on one or more CMRs and a plurality of IMRs, select one or more L1-SINRs from among the plurality of L1-SINRs, and report the selected L1-SINRs and IMR indexes used in the measurement of the selected L1-SINRs.

The UE may determine, based on a measurement result of at least one of an L1-RSRP and an L1-SINR, a measurement result and an index (at least one of a CMR index and an IMR index) to be reported. Whether the UE determines the measurement result and index to be reported based on only an L1-RSRP, only an L1-SINR, or both of the L1-RSRP and the L1-SINR may be configured by the higher layer signaling or may be defined in specifications.

When configured with reporting of N L1-RSRPs, the UE may report higher N L1-RSRPs among a plurality of measured L1-RSRPs and CMR indexes used in the measurement of the higher N L1-RSRPs. When configured with reporting of N L1-SINRs, the UE may report higher N L1-SINRs among a plurality of measured L1-SINRs and IMR indexes used in the measurement of the higher N L1-SINRs.

SPECIFIC EXAMPLES

In examples of FIGS. 4A to 4D, TRP #1 includes four beams #1-1, #1-2, #1-3, and #1-4, and TRP #2 includes four beams #2-1, #2-2, #2-3, and #2-4. A UE is connected to TRP #1. The UE is configured with one CMR #1 associated with four IMRs. The CMR corresponds to beam #1-1. IMRs #1 to #4 correspond to beams #2-1, #2-2, #2-3, and #2-4, respectively.

Figure 4A:
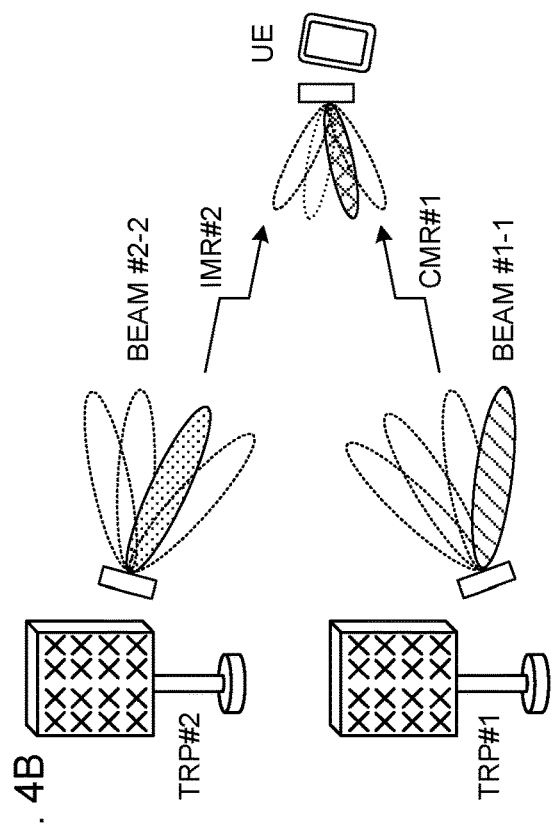
FIGS. 4A to 4D are diagrams to show an example of L1-SINR reporting according to First Embodiment.
Figure 4B:
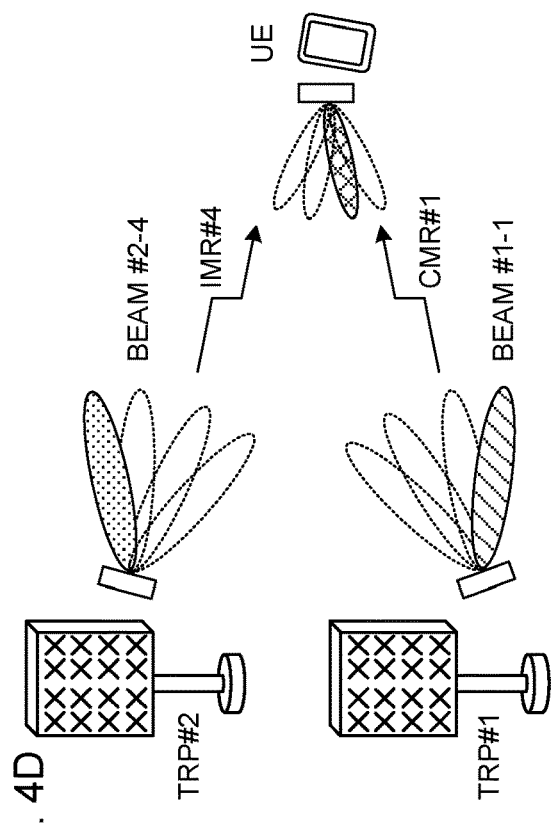
Figure 4C:
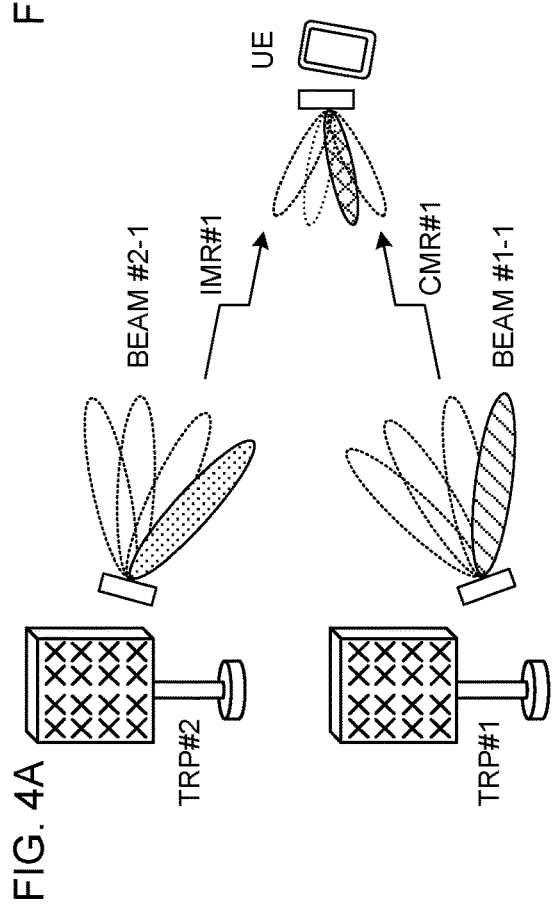
Figure 4D:
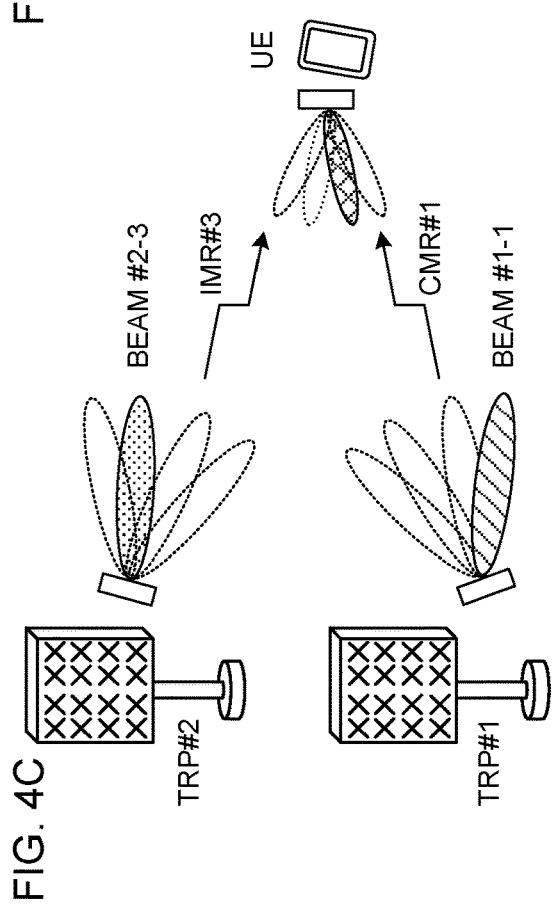

In the example of FIG. 4A, the UE measures an L1-SINR by using CMR #1 and IMR #1. In this case, the measured L1-SINR is $S_{1-2}/(I_{2-1}+I_{other})$. In this expression, $S_{1-1}$ is received power corresponding to beam #1-1, $I_{2-1}$ is received power corresponding to beam #2-1, and $I_{other}$ is received power corresponding to any other interference. In the example of FIG. 4B, the UE measures an L1-SINR by using CMR #1 and IMR #2. In this case, the measured L1-SINR is $S_{1-1}/(I_{2-2}+I_{other})$. In this expression, $I_{2-2}$ is received power corresponding to beam #2-2, and $I_{other}$ is received power corresponding to any other interference. In the example of FIG. 4C, the UE measures an L1-SINR by using CMR #1 and IMR #3. In this case, the measured L1-SINR is $S_{1-1}/(I_{2-3}+I_{other})$. In this expression, $I_{2-3}$ is received power corresponding to beam #2-3, and $I_{other}$ is received power corresponding to any other interference. In the example of FIG. 4D, the UE measures an L1-SINR by using CMR #1 and IMR #4. In this case, the measured L1-SINR is $S_{1-1}/(I_{2-4}+I_{other})$. In this expression, $I_{2-4}$ is received power corresponding to beam #2-4, and $I_{other}$ is received power corresponding to any other interference.

With such configuration, the UE can measure the four L1-SINRs (L1-SINRs in a number equal to the number of IMRs).

When reporting the higher two L1-SINRs (for example, beams #2-3 and #2-4), the UE may report the corresponding IMR indexes (for example, IMR indexes #3 and #4) together with the L1-SINRs. Note that the higher two L1-SINRs may be selected to be higher two L1-SINRs having the highest values among the measured L1-SINRs or higher two L1-SINRs having the highest L1-RSRP values (or signal electric power values) among the measured L1-SINRs, or may be two L1-SINRs selected by using both L1-SINR and L1-RSRP (or signal electric power) values from among the measured L1-SINRs.

The NW can reduce interference by performing beam selection and scheduling using L1-SINRs and IMR indexes.

<<Report Quantity Information>>

Report quantity information (for example, reportQuantity) configured by an RRC information element (IE) may include an IMR index.

The report quantity information may be an extension of the existing RRC parameter "reportQuantity" or may be expressed in a new RRC parameter. The new RRC parameter may be included in the CSI reporting configuration information (CSI-ReportConfig) and notified to the UE.

FIG. 5 is a diagram to show an example of the report quantity information for reporting at least one of an L1-SINR and an IMR index. The report quantity information is an extension of the existing RRC parameter "reportQuantity."

For example, any of the following may be specified as a reporting target by using the report quantity information:
  CMR index and L1-RSRP (configured by, for example, cri-RSRP or ssb-Index-RSRP)
  CMR index and L1-SINR (configured by, for example, cri-SINR or ssb-Index-SINR)
  CMR index, L1-RSRP, and L1-SINR (configured by, for example, cri-RSRP-SINR or ssb-Index-RSRP-SINR)
  CMR index, IMR index, and L1-SINR (configured by, for example, cri-imr-Index-SINR or ssb-Index-imr-Index-SINR)
  CMR index, IMR index, L1-RSRP, and L1-SINR (configured by, for example, cri-imr-Index-imr-Index-RSRP-SINR or ssb-Index-imr-Index-RSRP-SINR)
  IMR index (configured by, for example, imr-Index)

A CMR index and an IMR index may each be CRI or SSBRI. An imr-Index may be interpreted as imri, imi, or the like.

For example, when "ssb-Index-RSRP-SINR-imr-Index" is configured as the report quantity information, the UE may report an RSRP, an SSBRI used therefor, an L1-SINR, and an IMR index used therefor.

Note that the UE may include, in a report including a measurement result starting with "csi-", a CRI corresponding to the measurement result. Note that the UE may include, in a report including a measurement result starting with "ssb-", an SSBRI corresponding to the measurement result.

In the present disclosure, a name starting with "cri-", such as "cri-RSRP-SINR" may be interpreted as a name starting with "csi-", such as "csi-RSRQ" or "csi-RSRP-SINR."

FIG. 6 is a diagram to show another example of report quantity information for reporting at least one of an L1-SINR and an IMR index. The report quantity information is configured by a new RRC parameter "reportQuantity-r16." A reporting target that can be specified may be similar to that described with reference to FIG. 5.

This parameter may be notified to, for example, a UE (Rel-16 UE) compliant with Rel-16 NR. The UE may ignore "reportQuantity" when configured with "reportQuantity-r16." The existing RRC parameter "reportQuantity" may be notified to a UE (Rel-15 UE) compliant with Rel-15 NR. The Rel-15 UE may ignore the configuration with "reportQuantity-r16." In this manner, backward compatibility of specifications can be obtained. Note that Rel-16 may be replaced with a later release number.

A UE may make at least one of assumptions below when configured with the report quantity information indicating, as a reporting target, at least one of an L1-SINR and an IMR index:
  Low latency beam selection (or measurement or reporting) is performed;
  Low overhead beam selection (or measurement or reporting) is performed;

Beam failure recovery is performed at a secondary cell;
An interference measurement result (for example, L1-RSRQ or L1-SINR) is used for beam failure recovery;
An interference measurement result (for example, L1-RSRQ or L1-SINR) is used for beam selection; and
An interference measurement result (for example, L1-RSRQ or L1-SINR) is included in a beam reporting.

Note that low latency beam selection may be referred to as fast beam selection, beam selection without a TCI state (beam selection w/o TCI state), beam selection type II, TCI state specified type 2, or the like.

Low overhead beam selection may be, for example, a method of skipping reporting of a beam report under a certain condition.

Note that the UE may transmit, to a base station, UE capability information related to whether at least one of an L1-SINR and an IMR index can be reported. The base station may configure, to the UE having the UE capability information, the report quantity information including at least one of an L1-SINR and an IMR index.

A UE configured with a reporting target RS resource number larger than one by a higher layer parameter (for example, the RRC parameter "nrofReportedRS") included in CSI reporting configuration information may report, as a difference from a maximum L1-RSRP or L1-SINR, an L1-RSRP or L1-SINR corresponding to a certain RS (differential RSRP or differential SINR).

According to First Embodiment described above, a UE can prevent an overhead of reporting of an L1-SINR. An NW can recognize an IMR used in measurement of the reported L1-SINR.

Second Embodiment

A UE may be configured with an index (combination index or ID) of a combination of a CMR and an IMR when configured with L1-SINR measurement based on a CMR. The UE may be configured with one or more combinations (combination indexes) for L1-SINR measurement.

Association (for example, a table) of a combination index with a CMR and an IMR may be configured for the UE by the higher layer signaling or may be defined in specifications.

A combination of a CMR and an IMR may be referred to as a CSI process. A combination index may be referred to as a CSI process index.

When configured with reporting of an L1-SINR, the UE may report an L1-SINR and a combination index used in measurement of the L1-SINR. In this case, the UE does not necessarily need to report at least one of a CMR index and an IMR index. When configured with a combination index, the UE need not report a CMR index even in a case where L1-RSRP reporting is configured.

An overhead of reporting can be prevented when the UE reports a combination index.

The UE may measure a plurality of L1-RSRPs based on one or more CMRs, select one or more L1-RSRPs from among the plurality of L1-RSRPs, and report the selected L1-RSRPs and combination indexes used in the measurement of the selected L1-RSRPs.

The UE may measure a plurality of L1-SINRs based on a plurality of combinations, select one or more L1-SINRs from among the plurality of L1-SINRs, and report the selected L1-SINRs and combination indexes used in the measurement of the selected L1-SINRs.

The UE may determine, based on a measurement result of at least one of an L1-RSRP and an L1-SINR, a measurement result and an index (combination index) to be reported. Whether the UE determines the measurement result and index to be reported based on only an L1-RSRP, only an L1-SINR, or both of the L1-RSRP and the L1-SINR may be configured by the higher layer signaling or may be defined in specifications.

When configured with reporting of N L1-RSRPs, the UE may report higher N L1-RSRPs among a plurality of measured L1-RSRPs and combination indexes of resources used in the measurement of the higher N L1-RSRPs. When configured with reporting of N L1-SINRs, the UE may report higher N L1-SINRs among a plurality of measured L1-SINRs and combination indexes of resources used in the measurement of the higher N L1-SINRs.

In the report quantity information described in First Embodiment, an IMR index (imr-Index) may be interpreted as a combination index, and report quantity information including no CMR index (CRI (cri) or SSBRI (ssb-Index)) may be used. For example, when configured with report quantity information including an L1-SINR and a combination index, the UE may report an L1-SINR and the corresponding combination index.

SPECIFIC EXAMPLES

In examples of FIGS. 7A to 7D, TRP #1 includes four beams #1-1, #1-2, #1-3, and #1-4, and TRP #2 includes four beams #2-1, #2-2, #2-3, and #2-4. A UE is connected to TRP #1. The UE is configured with four combinations #1 to #4 of a CMR and an IMR.

Figure 7A:
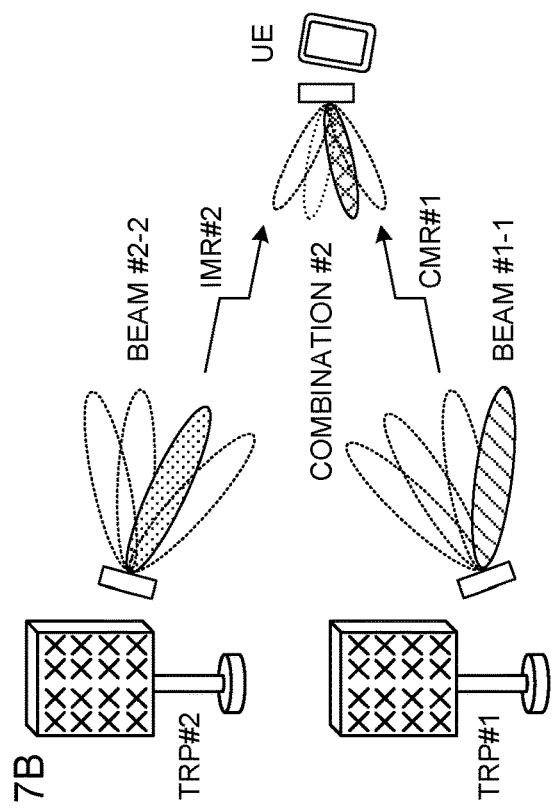
FIGS. 7A to 7D are diagrams to show an example of L1-SINR reporting according to Second Embodiment.
Figure 7B:
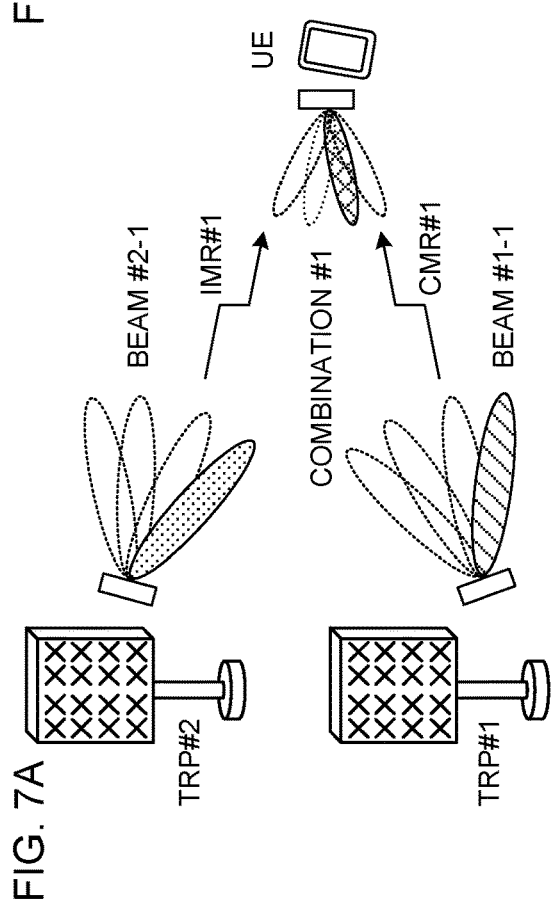
Figure 7C:
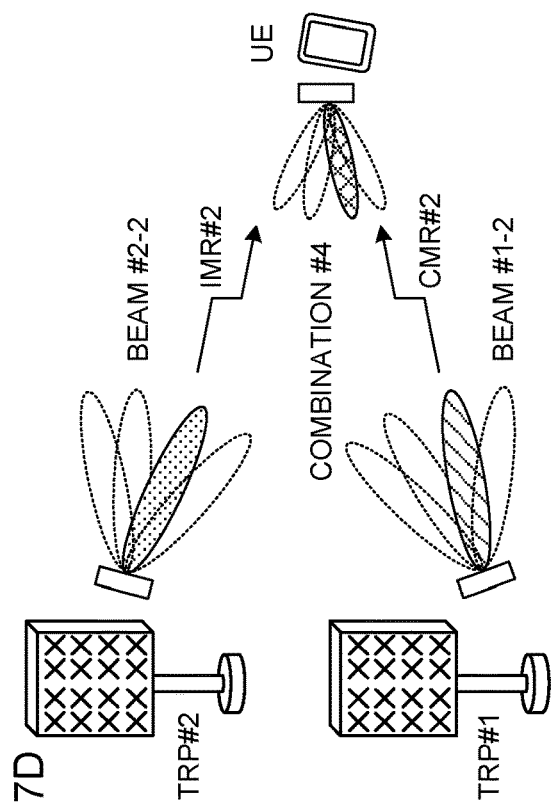
Figure 7D:
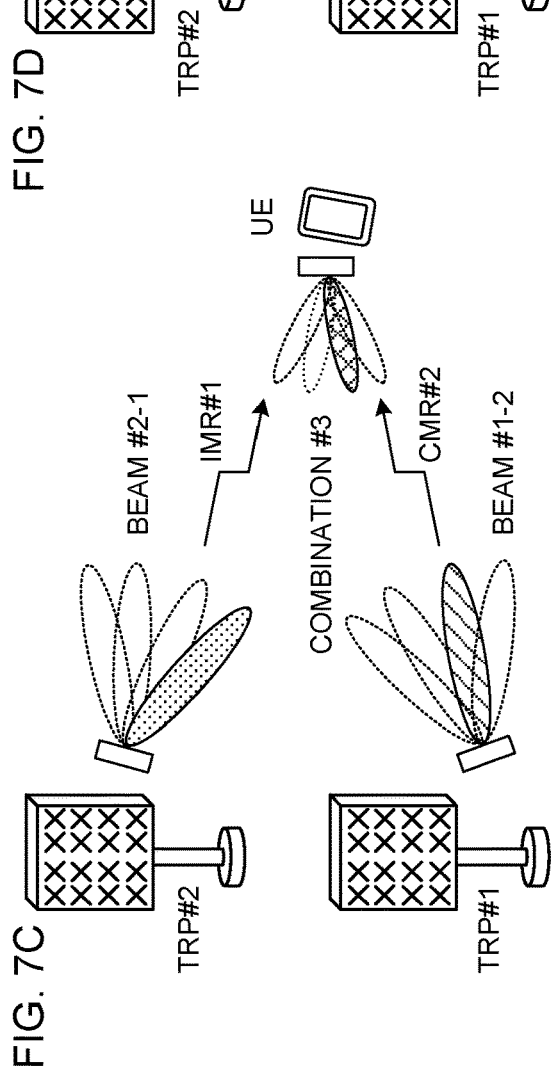

In the example of FIG. 7A, the UE measures an L1-SINR by using combination #1. Combination #1 is associated with CMR #1 (beam #1-1) and IMR #1 (beam #2-1). In this case, the measured L1-SINR is $S_{1-1}/(I_{2-1}+I_{other})$. In this expression, $S_{1-1}$ is received power corresponding to beam #1-1, $I_{2-1}$ is received power corresponding to beam #2-1, and $I_{other}$ is received power corresponding to any other interference. In the example of FIG. 7B, the UE measures an L1-SINR by using combination #2. Combination #2 is associated with CMR #1 (beam #1-1) and IMR #2 (beam #2-2). In this case, the measured L1-SINR is $S_{1-1}/(I_{2-2}+I_{other})$. In this expression, I22 is received power corresponding to beam #2-2, and $I_{other}$ is received power corresponding to any other interference. In the example of FIG. 7C, the UE measures an L1-SINR by using combination #3. Combination #3 is associated with CMR #2 (beam #1-2) and IMR #1 (beam #2-1). In this case, the measured L1-SINR is $S_{1-2}/(I_{2-1}+I_{other})$. In the example of FIG. 7D, the UE measures an L1-SINR by using combination #4. Combination #4 is associated with CMR #2 (beam #1-2) and IMR #2 (beam #2-2). In this case, the measured L1-SINR is $S_{1-2}/(I_{2-2}+I_{other})$.

With such configuration, the UE can measure four L1-SINRs (L1-SINRs in a number equal to the number of combinations).

According to Second Embodiment described above, a UE can prevent an overhead of reporting of an L1-SINR. An NW can recognize an IMR used in measurement of the reported L1-SINR.

Third Embodiment

An entry number (position) in a configured IMR set may correspond to an entry number (position) in a configured CMR set.

As in a CSI frame work of Rel. 15, a CMR set including one or more CMRs (CMR indexes) and an IMR set including one or more IMRs (IMR indexes) may be independently configured for a UE. For example, the UE may be configured with first CSI resource configuration information (CSI resource setting; for example, CSI-ResourceConfig) indicating a CMR set (for example, nzp-CSI-RS-SSB (nzp-CSI-RS-ResourceSetList, csi-SSB-ResourceSetList)), and second CSI resource configuration information indicating an IMR set (for example, csi-IM-ResourceSetList).

The UE may be configured with CSI reporting configuration information (CSI reporting setting; for example, CSI-ReportConfig) associated with first CSI resource configuration information (for example, resourcesForChannelMeasurement) and second CSI resource configuration information (for example, csi-IM-ResourcesForinterference or nzp-CSI-RS-ResourcesForInterference).

When interference measurement is performed on an IMR, a CMR may be associated with the IMR for each resource based on ordering of resources in the corresponding resource set. Here, the number of CMRs (for example, the number of CMRs (the number of entries; $K_S$) in the CMR set) may be equal to the number of IMRs (for example, the number of IMRs (the number of entries; $K_S$) in the corresponding IMR set).

The UE may report, together with a measured L1-SINR, the corresponding CMR index (for example, CRI or SSBRI). The UE may implicitly report a combination of a CMR and an IMR used in measurement by reporting a CMR index (indicator) indicating an index (order) of an entry in the CMR set and the same index (order) of an entry in the IMR set.

The UE may derive, with a reported CMR index as a condition, a CSI parameter other than the CMR index when the UE is configured with CSI reporting configuration information (for example, CSI-ReportConfig) including report quantity information (for example, higher layer parameter reportQuantity) including at least one of a CMR index (for example, CRI or SSBRI) and an SINR and $K_S$ resources ($K_S$ is larger than one) are configured in the CMR set. Here, CSI k (k≥0) may correspond to the (k+1)-th entry (for example, nzp-CSI-RS-Resource or SSB-Index) for which a resource is set in the CMR set (for example, nzp-CSI-RS-ResourceSet or csi-SSB-ResourceSet), and the (k+1)-th entry (for example, csi-IM-Resource) of a resource in the corresponding IMR set (for example, csi-IM-ResourceSet) (when the corresponding IMR set is configured).

For example, when configured with reporting of an SINR and a CMR index k, the UE may measure the SINR based on a CMR in the (k+1)-th entry in the CMR set and an IMR in the (k+1)-th entry in the IMR set.

The UE may measure an L1-SINR based on a resource in the (k+1)-th entry in the CMR set and a resource in the (k+1)-th entry in the IMR set and may report the measured SINR and the corresponding CMR index k. The UE may measure $K_S$ L1-SINRs based on the CMR set including $K_S$ CMRs and the IMR set including $K_S$ IMRs, and may report measured $K_S$ SINRs and the corresponding respective $K_S$ CMR indexes k or report the $K_S$ SINRs in the order of the CMR indexes without reporting the CMR indexes.

In the report quantity information described in First Embodiment, report quantity information including no IMR index (imr-Index) may be used. A CMR index may be a CRI (cri) or an SSBRI (ssb-Index). For example, when configured with report quantity information including an L1-SINR and a CMR index, the UE may report an L1-SINR and the corresponding CMR index.

Specific Examples

Figure 8:
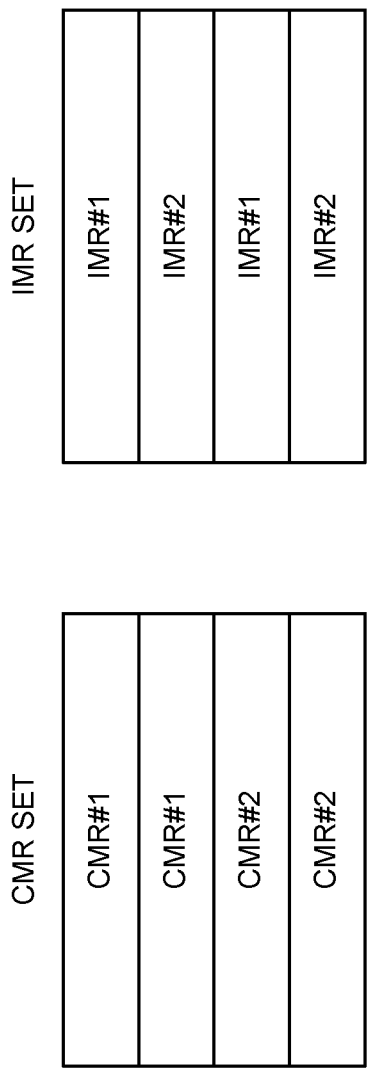
FIG. 8 is a diagram to show an example of association in a CMR set and an IMR set.

FIG. 8 is a diagram to show an example of association in a CMR set and an IMR set.

The UE may be configured with a CMR set including four CMRs and an IMR set including four IMRs and may be configured with CSI reporting configuration information indicating the CMR set and the IMR set. For example, the UE may measure, based on CMR index 0, an SINR by using CMR #1 corresponding to the first entry in the CMR set and IMR #1 corresponding to the first entry in the IMR set, and may report the measured SINR together with the corresponding CMR index 0. For example, the UE may measure, based on CMR index 1, an SINR by using CMR #1 corresponding to the second entry in the CMR set and IMR #2 corresponding to the second entry in the IMR set, and may report the measured SINR together with the corresponding CMR index 1. With this association, measurement/reporting in FIG. 7 can be achieved.

According to Third Embodiment described above, a UE can prevent an overhead of reporting of an L1-SINR. An NW can recognize an IMR used in measurement of the reported L1-SINR.

Fourth Embodiment

A UE may be configured with an L1-SINR reporting (measurement) resource including a CMR and an IMR. An L1-SINR reporting resource may be interpreted as a CMR and an IMR.

An L1-SINR reporting (measurement) resource may be identified by an L1-SINR reporting index (ID or entity).

Association (for example, a table) of an L1-SINR reporting resource with a CMR and an IMR may be configured for the UE by the higher layer signaling or may be defined in specifications.

The UE may measure a plurality of L1-RSRPs based on one or more CMRs, select one or more L1-RSRPs from among the plurality of L1-RSRPs, and report the selected L1-RSRPs and CMR indexes used in the measurement of the selected L1-RSRPs.

The UE may measure a plurality of L1-SINRs based on a plurality of L1-SINR reporting resources, select one or more L1-SINRs from among the plurality of L1-SINRs, and report the selected L1-SINRs and L1-SINR reporting indexes used in the measurement of the selected L1-SINRs.

The UE may determine, based on a measurement result of at least one of an L1-RSRP and an L1-SINR, a measurement result and an index to be reported (L1-SINR reporting index). Whether the UE determines the measurement result and index to be reported based on only an L1-RSRP, only an L1-SINR, or both of the L1-RSRP and the L1-SINR may be configured by the higher layer signaling or may be defined in specifications.

When configured with reporting of N L1-RSRPs, the UE may report higher N L1-RSRPs among a plurality of measured L1-RSRPs and L1-SINR reporting indexes of resources used in the measurement of the higher N L1-RSRPs. When configured with reporting of N L1-SINRs, the UE may report higher N L1-SINRs among a plurality of measured L1-SINRs and L1-SINR reporting indexes of resources used in the measurement of the higher N L1-SINRs.

In the report quantity information described in First Embodiment, an IMR index (imr-Index) may be interpreted as an L1-SINR reporting index, and report quantity information including no CMR index (CRI (cri) or SSBRI (ssb-Index)) may be used. For example, when configured with report quantity information including an L1-SINR and an L1-SINR reporting index, the UE may report an L1-SINR and the corresponding L1-SINR reporting index.

Specific Examples

In examples of FIGS. 9A to 9D, TRP #1 includes four beams #1-1, #1-2, #1-3, and #1-4, and TRP #2 includes four beams #2-1, #2-2, #2-3, and #2-4. A UE is configured with four L1-SINR reporting resources #1 to #4.

In the example of FIG. 9A, the UE may measure an L1-SINR by using L1-SINR reporting resource #1. L1-SINR reporting resource #1 is associated with CMR #1 and IMR #1. In the example of FIG. 9B, the UE measures an L1-SINR by using L1-SINR reporting resource #2. L1-SINR reporting resource #2 is associated with CMR #1 and IMR #2. In the example of FIG. 9C, the UE measures an L1-SINR by using L1-SINR reporting resource #3. L1-SINR reporting resource #3 is associated with CMR #1 and IMR #3. In the example of FIG. 9D, the UE measures an L1-SINR by using L1-SINR reporting resource #4. L1-SINR reporting resource #4 is associated with CMR #1 and IMR #4.

For example, when the UE reports the L1-SINR reporting index of "3" and the L1-SINR of "m" dB, an NW recognizes that an L1-SINR based on interference electric power 12_3 measured by using IMR #3 is reported.

In examples of FIGS. 7A to 7D, a combination may be interpreted as an L1-SINR reporting resource, and a combination index may be interpreted as an L1-SINR reporting index.

According to Fourth Embodiment described above, a UE can prevent an overhead of reporting of an L1-SINR. An NW can recognize an IMR used in measurement of the reported L1-SINR.

Fifth Embodiment

A UE may report UE capability information related to L1-SINR reporting.

The UE capability information may include the value of the number of L1-SINRs to be reported (for example, the maximum number of L1-SINRs to be reported). The UE does not need to assume reporting of L1-SINRs in a number larger than the value (does not need to expect that the UE is configured with reporting of L1-SINRs in a number larger than the value).

The UE capability information may include the value of the number of CMRs (for example, at least one of an SSBRI and a CRI) to be reported (for example, the maximum number of CMRs to be reported). The UE does not need to assume measurement of an L1-SINR by using CMRs in a number larger than the value (does not need to expect that the UE is configured with measurement or reporting using CMRs in a number larger than the value).

The UE capability information may include the value of the number of IMRs (for example, an index of at least one of a ZP-CSI-RS resource, an NZP-CSI-RS resource, and an SSB resource) to be reported (for example, the maximum number of IMRs to be reported). The UE does not need to assume measurement of an L1-SINR by using IMRs in a number larger than the value (does not need to expect that the UE is configured with measurement or reporting using IMRs in a number larger than the value).

When the UE reports the value of at least one of an L1-RSRP, an L1-SINR, a CMR index, an IMR index, a combination index, and an L1-SINR reporting index, the number of reported values may be configured by the higher layer signaling or may be defined in specifications.

According to Fifth Embodiment described above, a UE can be appropriately configured with L1-SINR reporting in accordance with capability.

<Use Cases>

According to each embodiment described above, at least one of use cases 1 and 2 below can be achieved.

<<Use Case 1>>

When cooperatively performing transmission to one UE or when performing transmission to different UEs, two TRPs may cooperatively perform scheduling.

A UE having capability of simultaneously receiving different beams from two TRPs may be configured with group-based beam reporting and may report a beam pair to the two TRPs. An NW can use the reported beam pair for scheduling.

A UE having no capability of simultaneously receiving different beams from two TRPs may be scheduled by one TRP. When TRP #1 is a serving TRP (when UE #1 is connected to TRP #1) and UE #1 is positioned at a cell edge between two TRPs, TRP #2 preferably knows which beam from TRP #2 has small interference with the UE to reduce probability of interference from TRP #2.

Figure 10:
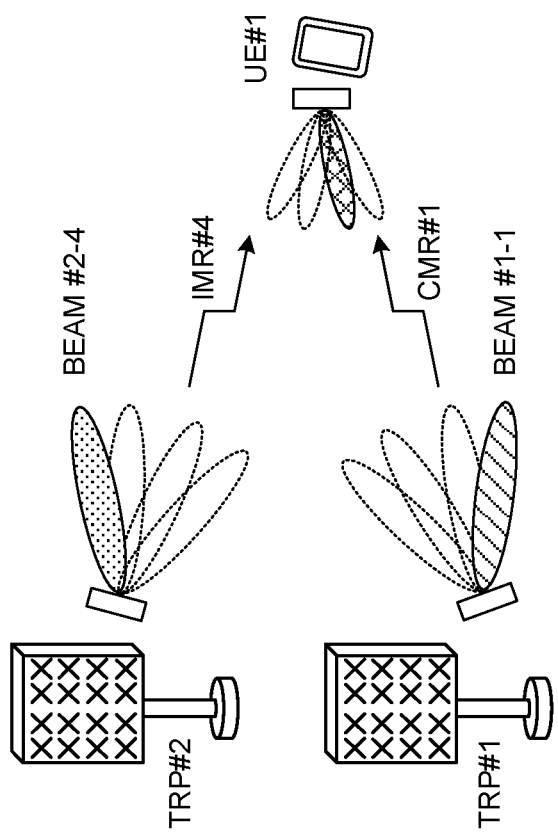
FIG. 10 is a diagram to show an example of use case 1.

In an example of FIG. 10, UE #1 is configured with four IMRs #1 to #4 by TRP #1. IMRs #1 to #4 correspond to beams #2-1 to #2-4, respectively, from TRP #2.

UE #1 may report the most preferable beam among beams #1-1 to #1-4. TRP #1 may select a beam to UE #1 based on this report. UE #1 may report a beam that provides the lowest interference among beams #2-1 to #2-4. UE #1 determines that beam #2-4 from TRP #2 provides the lowest interference (highest L1-SINR) and explicitly or implicitly reports the IMR index of "4" together with an L1-SINR based on IMR #4.

Two TRPs #1 and #2 perform cooperative scheduling based on the reporting from UE #1. Accordingly, TRP #1 schedules UE #1 for use of beam #1-2, and in a duration in which UE #1 is scheduled, TRP #2 selects beam #2-4 to reduce interference with UE #1 and schedules UE #2 for use of beam #2-4.

In this manner, inter-TRP interference can be reduced when a UE explicitly or implicitly reports an IMR corresponding to an L1-SINR.

<<Use Case 2>>

One TRP may simultaneously use a plurality of beams with a plurality of panels. For example, TRP #1 uses panel #1 for one UE #1 and uses panel #2 for another UE #2.

Accordingly, operation similar to multi-user (MU)-multi-input multi-output (MIMO) in frequency range (FR) 2 can be more easily achieved.

Figure 11:
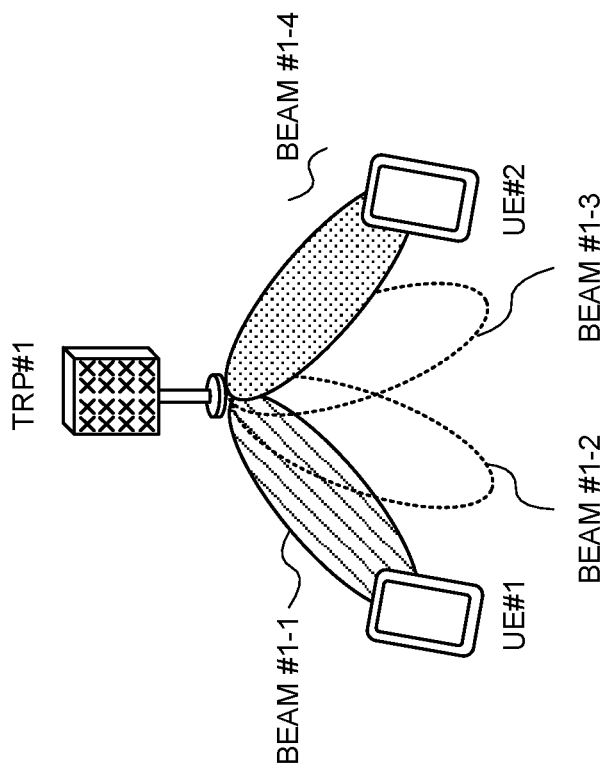
FIG. 11 is a diagram to show an example of use case 2.

In an example of FIG. 11, UEs #1 and #2 are configured with four IMRs #1 to #4 by TRP #1. IMRs #1 to #4 correspond to beams #1-1 to #1-4, respectively.

UEs #1 and #2 may each report the most preferable beam (for example, a beam that is the most preferable based on at least one of an L1-RSRP and an L1-SINR) among beams #1-1 to #1-4. TRP #1 may select beams for the UEs based on this report. UEs #1 and #2 may each report a beam that provides the lowest interference among beams #1-1 to #1-4. UE #1 determines that beam #1-4 provides the lowest interference (highest L1-SINR) and explicitly or implicitly reports the IMR index of "4" together with an L1-SINR based on IMR #4. Similarly, UE #2 reports the IMR index of "1" together with an L1-SINR based on IMR #1.

Based on these reports, TRP #1 transmits a PDSCH for UE #1 by using panel #1 and TCI state #1 and transmits a PDSCH for UE #2 by using different panel #2 and different TCI state #2 in the same band (for example, physical resource block (PRB)).

Inter-UE interference is not considered when TRP #1 performs beam selection based on the most preferable RSRP (as in Rel. 15).

In this manner, inter-UE interference can be reduced when a UE explicitly or implicitly reports an IMR corresponding to an L1-SINR.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
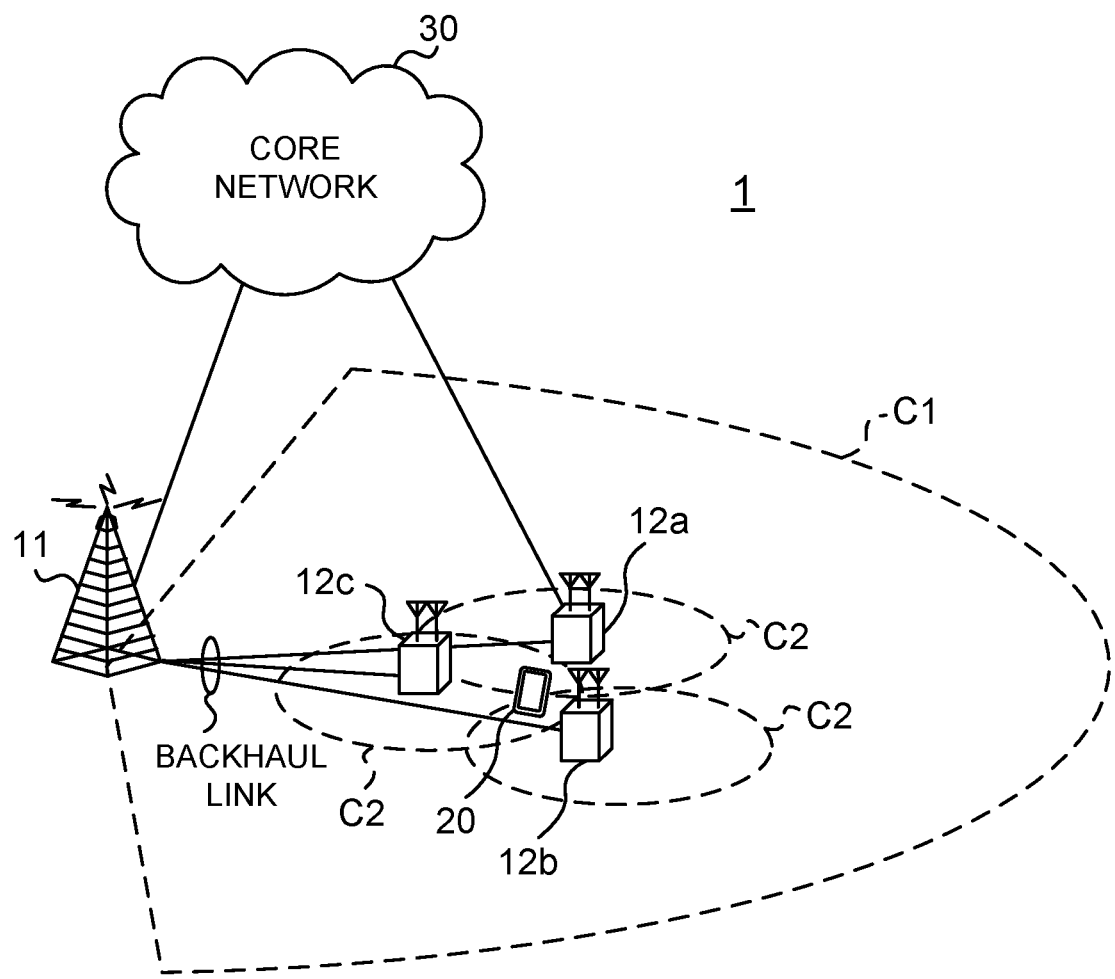
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
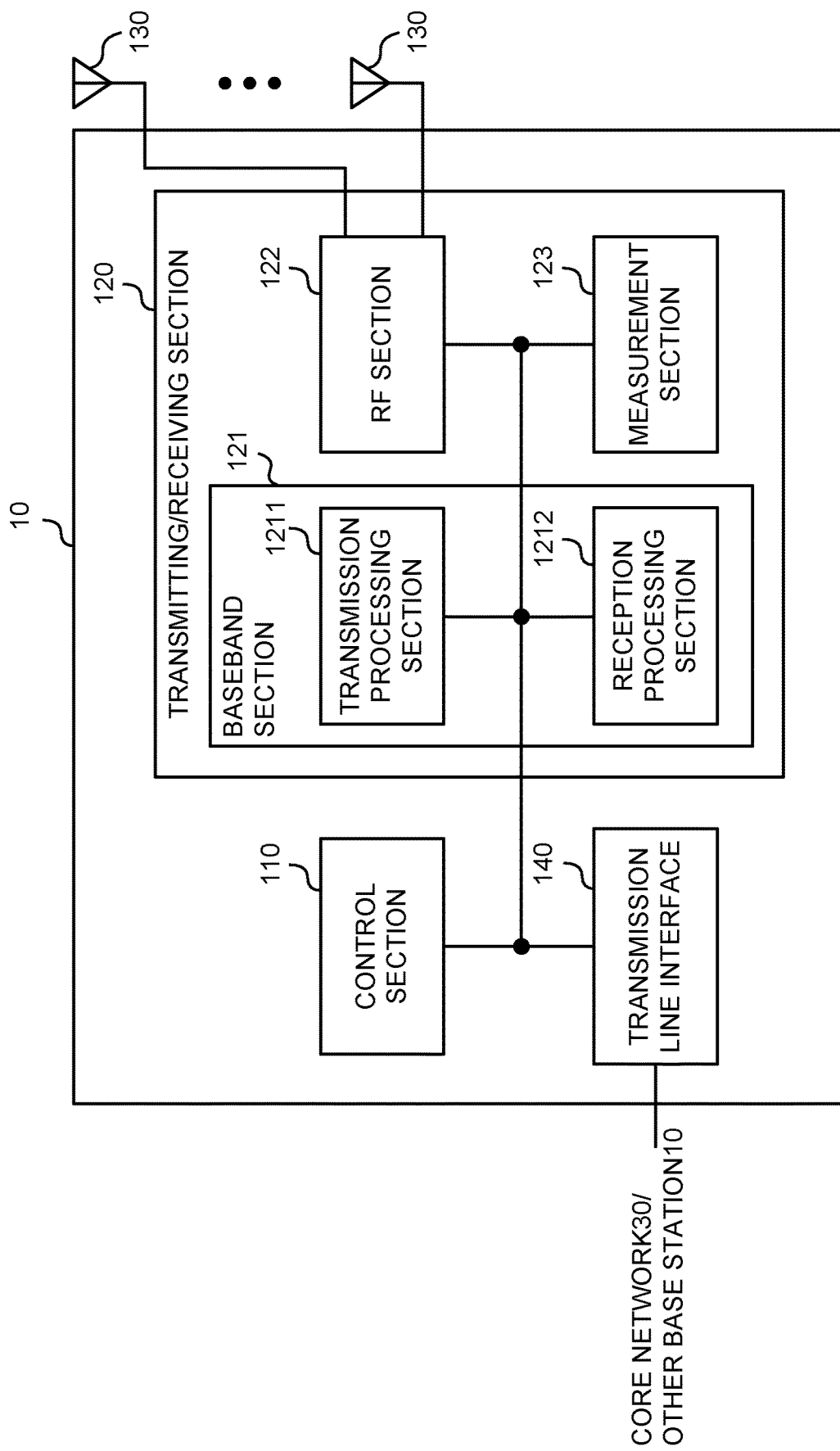
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120 and the transmitting/receiving antennas 130.

(User Terminal)

Figure 14:
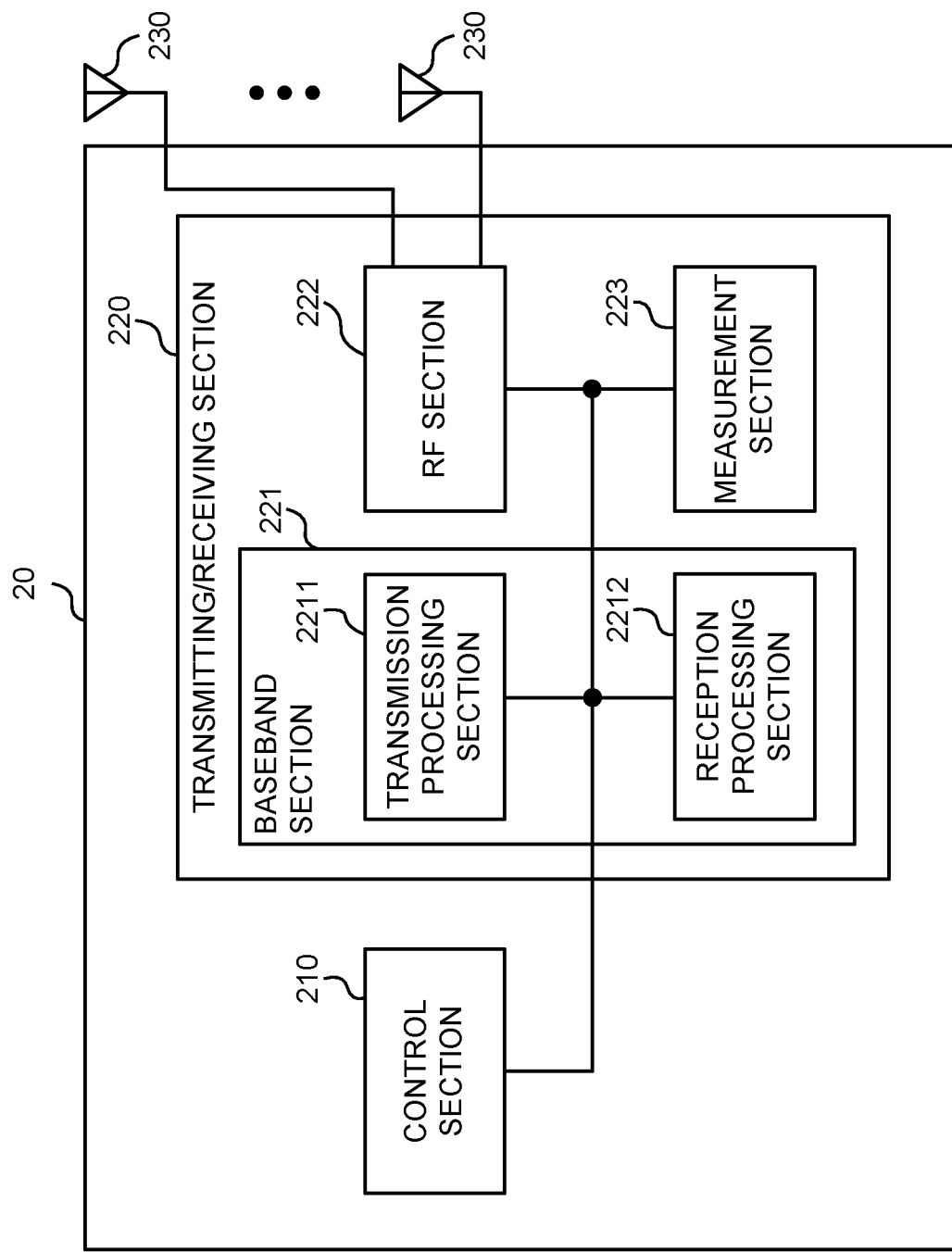
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The control section 210 may measure a Signal to Interference plus Noise Ratio (SINR), based on a channel measurement resource at a given order (for example, the (k+1)-th entry) in a channel measurement resource set and an interference measurement resource at the given order (for example, the (k+1)-th entry) in an interference measurement resource set. The transmitting/receiving section 220 may report the SINR and an indicator (for example, a CMR index, an SSBRI, a CRI, or k) related to the given order.

The number (for example, $K_S$) of channel measurement resources in the channel measurement resource set may be equal to the number of interference measurement resources in the interference measurement resource set.

The control section 210 may be configured with, by higher layer signaling, first CSI resource configuration information indicating the channel measurement resource set, second CSI resource configuration information indicating the interference measurement resource set, and CSI reporting configuration information associated with the first CSI resource configuration information and the second CSI resource configuration information.

The CSI reporting configuration information may indicate a report quantity including the indicator and the SINR.

Each channel measurement resource in the channel measurement resource set may be a resource of at least one of a channel state information (CSI)-reference signal (RS) and a synchronization signal block.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
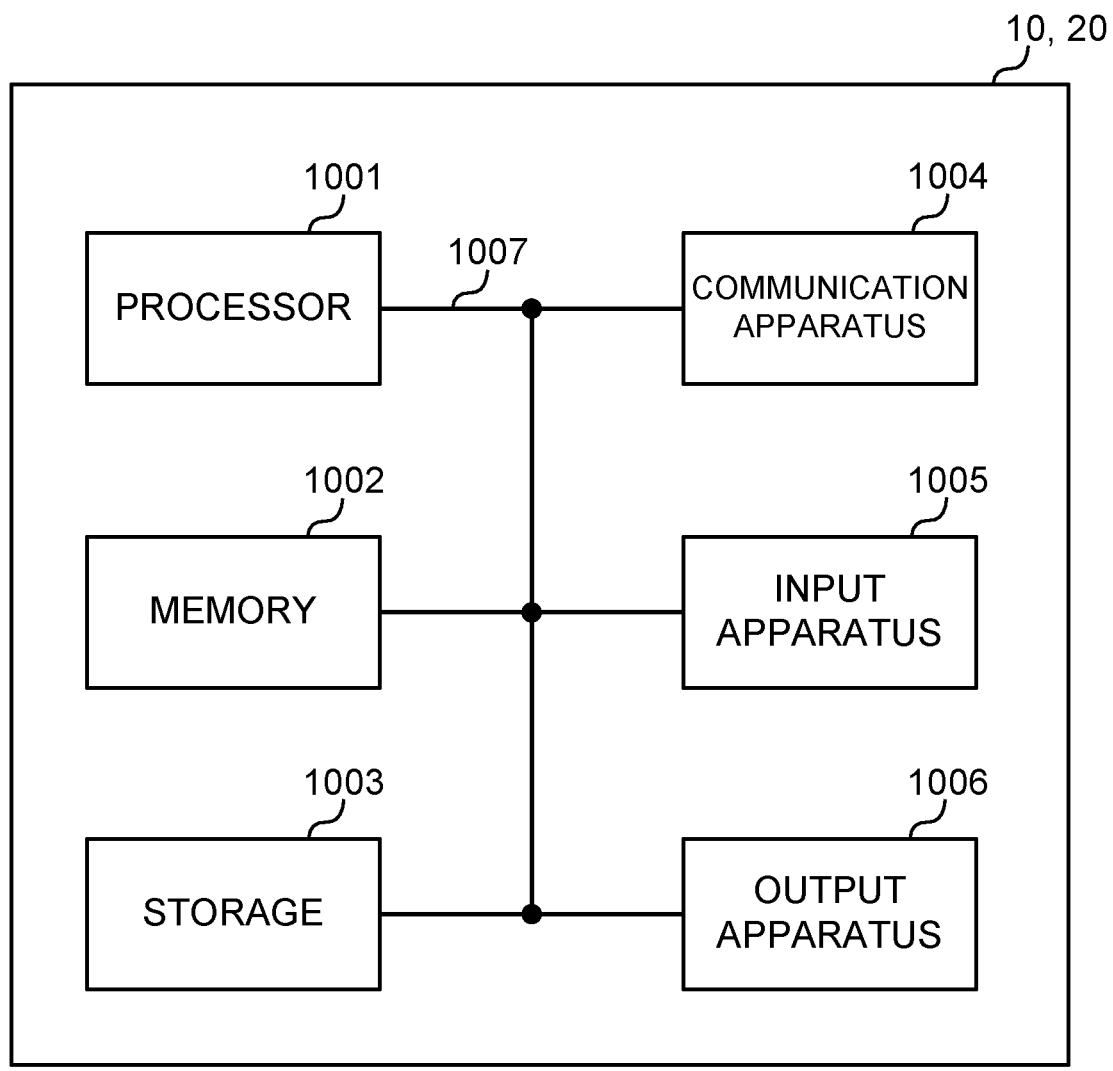
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives Channel State Information (CSI) report configuration information having report quantity information that indicates a CSI parameter to report; and
a processor that, when the report quantity information indicates an index k of a Channel Measurement Resource (CMR) and a Signal to Interference plus Noise Ratio (SINR), one CMR set includes a plurality of CMRs and one Interference Measurement Resource (IMR) set includes a plurality of IMRs, derives the SINR corresponding to the index,
wherein the index k of the CMR is an integer equal to or greater than 0 and the index k of the CMR corresponds to $(k+1)^{th}$ CMR in the CMR set and to $(k+1)^{th}$ IMR in the IMR set,
wherein the processor controls to report capability information regarding the SINR and the capability information includes a maximum number of CMRs to report, and
wherein the index k of the CMR is a Synchronization Signal Block Resource Indicator (SSBRI).

2. The terminal according to claim 1, wherein the CMR is a non-zero power CSI-RS resource or a synchronization signal resource, and the IMR is a CSI interference measurement resource.

3. The terminal according to claim 1, wherein when reporting a plurality of SINRs, the control section controls to report one SINR and one or more differential SINRs from the one SINR.

4. A radio communication method for a terminal, comprising:
receiving Channel State Information (CSI) report configuration information having report quantity information that indicates a CSI parameter to report;
when the report quantity information indicates an index k of a Channel Measurement Resource (CMR) and a Signal to Interference plus Noise Ratio (SINR), one CMR set includes a plurality of CMRs and one Interference Measurement Resource (IMR) set includes a plurality of IMRs, deriving the SINR corresponding to the index; and
reporting capability information regarding the SINR and the capability information includes a maximum number of CMRs to report, wherein the index k of the CMR is an integer equal to or greater than 0 and the index k of the CMR corresponds to $(k+1)^{th}$ CMR in the CMR set and to $(k+1)^{th}$ IMR in the IMR set, and wherein the index k of the CMR is a Synchronization Signal Block Resource Indicator (SSBRI).

5. A system comprising a base station and a terminal, wherein the base station comprises:
    a transmitter that transmits Channel State Information (CSI) report configuration information having report quantity information that indicates a CSI parameter to report, and the terminal comprises:
    a receiver that receives the CSI report configuration information; and
    a processor that, when the report quantity information indicates an index k of a Channel Measurement Resource (CMR) and a Signal to Interference plus Noise Ratio (SINR), one CMR set includes a plurality of CMRs and one Interference Measurement Resource (IMR) set includes a plurality of IMRs, derives the SINR corresponding to the index, wherein the index k of the CMR is an integer equal to or greater than 0 and the index k of the CMR corresponds to $(k+1)^{th}$ CMR in the CMR set and to $(k+1)^{th}$ IMR in the IMR set, wherein the processor controls to report capability information regarding the SINR and the capability information includes a maximum number of CMRs to report, and wherein the index k of the CMR is a Synchronization Signal Block Resource Indicator (SSBRI).

\* \* \* \* \*